US008933777B2

(12) United States Patent
Cai

(10) Patent No.: US 8,933,777 B2
(45) Date of Patent: Jan. 13, 2015

(54) GATE CONTROL SYSTEM AND METHOD OF REMOTE UNLOCKING BY VALIDATED USERS

(75) Inventor: Chengliang Cai, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 413 days.

(21) Appl. No.: 13/258,582

(22) PCT Filed: Jan. 6, 2010

(86) PCT No.: PCT/CN2010/070029
§ 371 (c)(1),
(2), (4) Date: Nov. 2, 2011

(87) PCT Pub. No.: WO2010/127563
PCT Pub. Date: Nov. 11, 2010

(65) Prior Publication Data
US 2012/0038454 A1 Feb. 16, 2012

(30) Foreign Application Priority Data

May 4, 2009 (CN) .......................... 2009 1 0137655

(51) Int. Cl.
*G08B 29/00* (2006.01)
*G07C 9/00* (2006.01)
*H04L 9/32* (2006.01)

(52) U.S. Cl.
CPC .......... *G07C 9/00309* (2013.01); *H04L 9/3226* (2013.01); *G07C 2009/005* (2013.01)
USPC ......... 340/5.21; 340/5.2; 340/5.26; 340/5.51; 340/5.6; 340/10.51; 341/78; 235/382.5; 700/237

(58) Field of Classification Search
USPC ............. 340/5.73, 5.1, 5.23, 5.25, 5.33, 5.61, 340/5.64, 5.54, 5.53, 5.21, 5.2, 5.26, 5.51, 340/5.6, 10.51, 10.52; 379/100.05, 100.06; 455/410; 382/115; 713/186, 202; 73/63; 341/78; 235/382.5; 700/237
See application file for complete search history.

(56) References Cited

U.S. PATENT DOCUMENTS

| 2002/0099945 A1* | 7/2002 | McLintock et al. .......... 713/186 |
| 2002/0122571 A1* | 9/2002 | Bradley et al. ............... 382/115 |
| 2002/0178385 A1* | 11/2002 | Dent et al. .................... 713/202 |
| 2004/0219903 A1* | 11/2004 | Despain et al. .............. 455/410 |
| 2007/0290797 A1* | 12/2007 | Harkins et al. .............. 340/5.73 |

FOREIGN PATENT DOCUMENTS

| CN | 101127133 A | 2/2008 |
| CN | 201145918 Y | 11/2008 |

(Continued)

OTHER PUBLICATIONS

International Search Report for PCT/CN2010/070029 dated Mar. 29, 2010.

*Primary Examiner* — Steven Lim
*Assistant Examiner* — Sisay Yacob
(74) *Attorney, Agent, or Firm* — Ling Wu; Stephen Yang; Ling and Yang Intellectual Property

(57) ABSTRACT

An access control system includes: a lock control apparatus, an authentication terminal and a terminal to be authenticated; said authentication terminal sends own identity information to the lock control apparatus to be authenticated, and generates a random authorization code after receiving an authentication passing message responded by said lock control apparatus, and sends it to said terminal to be authenticated and lock control apparatus respectively; said lock control apparatus stores the identity information of a legal user, and authenticates the identity information sent by said authentication terminal, and responds said authentication passing message after passing authentication; and the lock control apparatus interworks with said terminal to be authenticated after receiving said random authorization code, and if judging that both of the random authorization codes are consistent, then unlocks; said terminal to be authenticated stores a received random authorization code, and interworks said random authorization code with said lock control apparatus.

13 Claims, 2 Drawing Sheets

(56) References Cited

FOREIGN PATENT DOCUMENTS

| CN | 101345626 A | 1/2009 |
|---|---|---|
| CN | 101551920 A | 10/2009 |
| EP | 1411475 A1 | 4/2004 |
| JP | 11107593 A | 4/1999 |
| JP | 2002213126 A | 7/2002 |
| WO | 2007126375 A1 | 11/2007 |

\* cited by examiner

GATE CONTROL SYSTEM AND METHOD OF REMOTE UNLOCKING BY VALIDATED USERS

TECHNICAL FIELD

The present invention relates to the wireless terminal technique, and particularly, to an access control system and a method for remote control unlocking of a legal user.

BACKGROUND OF THE RELATED ART

It is well known that a plurality of existing access control systems are that the card information and fingerprint information and so on are transmitted to the access control system in the way of authorization information such as the IC card, password or fingerprint and so on, and the software judges whether the person who makes a request for entering is legal by comparison. That means only the legal user who has the above authorization information can pass the authentication of the access control system to enter the building.

When other users who do not have the authorization information visit the legal user and this legal user is not in the house to be unable to open the door for this visitor, this visitor is only able to be refused entering or follow other legal users to enter the building, which brings great convenience for users using this system.

Besides, the existing access control system requires much wiring before installation, which invests more cost, and the access control system is unable to be used once the IC card is damaged or lost.

SUMMARY OF THE INVENTION

The technical problem to be solved in the present invention is to provide an access control system and a method for remote control unlocking of a legal user so as to overcome the drawback that the legal user is unable to open the door for visitors who are allowed to enter but do not have the authority when the legal user is not in the house.

In order to solve the above problem, the present invention provides an access control system, which comprises a lock control apparatus, an authentication terminal and a terminal to be authenticated, wherein said authentication terminal is used for sending own identity information to the lock control apparatus to be authenticated, and is also used for generating a random authorization code after receiving an authentication passing message responded by said lock control apparatus, and sending the random authorization code to said terminal to be authenticated and lock control apparatus respectively;

said lock control apparatus stores the identity information of a legal user; and said lock control apparatus is used for authenticating the identity information sent by said authentication terminal, and responding said authentication passing message to said authentication terminal after passing authentication; and is also used for interworking with said terminal to be authenticated after receiving said random authorization code, and if judging that the random authorization codes of the authentication terminal and the terminal to be authenticated are consistent, then unlocking;

said terminal to be authenticated is used for storing a received random authorization code, and is further used for interworking said random authorization code with said lock control apparatus.

Furthermore, the identity information sent by said authentication terminal to said lock control apparatus is identifier information of said authentication terminal, or is user name and password information input by a user using said authentication terminal.

Furthermore, said lock control apparatus further stores standard voice information of all the legal users;

said lock control apparatus is further used for sending the standard voice information corresponding to this legal user to said authentication terminal after confirming that identity information is legal according to the identity information sent by said authentication terminal, comparing received voice information sent by said authentication terminal and above standard voice information, and if judging that the received voice information sent by said authentication terminal and the above standard voice information are from a same one person, further responding said authentication passing message to said authentication terminal;

said authentication terminal is further used for prompting the user to repeat after receiving the standard voice information sent by said lock control apparatus; and is further used for sending the voice information repeated by the user to said lock control apparatus.

Furthermore, said lock control apparatus is further used for deleting the random authorization code stored by itself or setting the random authorization code stored by itself to be invalid after unlocking.

Furthermore, said lock control apparatus comprise: a wireless transceiver module, a storage module, an authentication module, an interworking module and an electromagnetic lock;

said storage module is used for storing the identity information of all the legal users;

said wireless transceiver module is used for receiving the identity information sent by said authentication terminal; and is further used for sending said authentication passing message sent by said authentication module to said authentication terminal; and is further used for receiving said random authorization code, and sending the random authorization code to said interworking module;

said authentication module is used for authenticating said received identity information according to the identity information of the legal user stored in said storage module, and sending said authentication passing message to said wireless transceiver module after passing the authentication;

said interworking module is used for interworking with said terminal to be authenticated after receiving said random authorization code, and if judging that the random authorization codes of the authentication terminal and the terminal to be authenticated are consistent, then indicating said electromagnetic lock to unlock.

The present invention further provides an access control system, which comprises a lock control apparatus, an authentication terminal and a terminal to be authenticated; said authentication terminal and lock control apparatus store a same authorization code; wherein said authentication terminal sends said authorization code to said terminal to be authenticated;

said lock control apparatus is used for interworking with said terminal to be authenticated, and if judging that the authorization codes of the lock control apparatus and the terminal to be authenticated are consistent, then unlocking;

said terminal to be authenticated is used for storing a received said authorization code, and is further used for interworking said authorization code with said lock control apparatus.

The present invention further provides a method for remote control unlocking of a legal user, and this method comprises:

said legal user using an authentication terminal to send own identity information to said lock control apparatus to carry out authentication;

said lock control apparatus authenticating said identity information sent by said authentication terminal, and responding an authentication passing message to said authentication terminal after passing authentication;

said authentication terminal generating a random authorization code after receiving the authentication passing message responded by said lock control apparatus, and sending the random authorization code to the terminal to be authenticated and the lock control apparatus respectively;

said lock control apparatus interworking with said terminal to be authenticated after receiving the above random authorization code, and if judging that the random authorization codes of the authentication terminal and the terminal to be authenticated are consistent, then unlocking.

Furthermore, said identity information is identifier information of said authentication terminal, or is user name and password information input by a legal user using said authentication terminal.

Furthermore, the lock control apparatus further stores standard voice information of all the legal users;

said lock control apparatus authenticating said identity information sent by said authentication terminal, and responding the authentication passing message to said authentication terminal after passing authentication particularly comprises:

said lock control apparatus sending the standard voice information corresponding to this legal user to said authentication terminal after confirming that this identity information is legal according to the identity information sent by said authentication terminal;

said authentication terminal prompting a user to repeat after receiving the standard voice information sent by said lock control apparatus, and sending voice information repeated by the user to said lock control apparatus;

said lock control apparatus comparing received voice information sent by the authentication terminal with the above standard voice information, and if judging that the received voice information and the standard voice information are from a same person, responding said authentication passing message to said authentication terminal.

Furthermore, this method further comprises:

said lock control apparatus deleting the random authorization code stored by itself or setting the random authorization code stored by itself to be invalid after unlocking.

The present invention further provides a method for remote control unlocking of a legal user, which comprises:

said legal user storing a same authorization code in an authentication terminal and a lock control apparatus;

said authentication terminal sending said authorization code to said terminal to be authenticated;

said lock control apparatus interworking with said terminal to be authenticated, and if judging that the authorization codes of the terminal to be authenticated and the lock control apparatus are consistent, then unlocking.

After adopting the present invention, the legal user can let the person, who is allowed to enter but does not have the authority to open the door, enter by remote control opening the door. Besides, since the authentication terminal and the lock control apparatus make use of the wireless network to communicate, it is unnecessary to make wiring when this access control system is installed, and the expense will not be increased if the legal users are increased.

PREFERRED EMBODIMENTS OF THE PRESENT INVENTION

Below it will describe the technical scheme of the present invention in more detail with reference to figures and examples.

Figure 1:
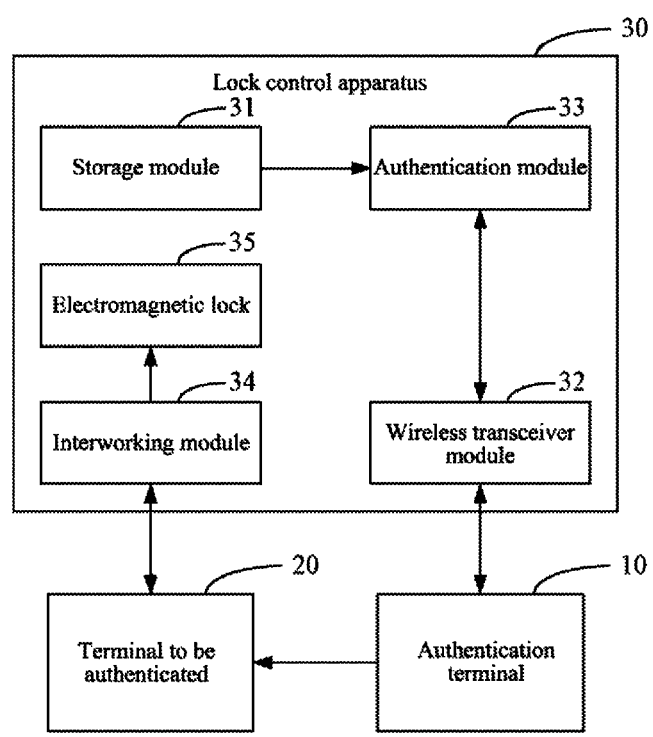
FIG. 1 is a structure block diagram of the access control system according to the example of the present invention.

The present invention provides an access control system, which is applied in the case of remote control unlocking of the legal user, and as shown in FIG. 1, this access control system comprises: an authentication terminal 10, a terminal to be authenticated 20 and a lock control apparatus 30. Wherein, the authentication terminal 10 is used for sending own identity information to the lock control apparatus 30 to be authenticated, and is also used for generating one random authorization code after receiving the authentication passing message responded by the lock control apparatus 30 and sending the random authorization code to the terminal to be authenticated 20 and the lock control apparatus 30 respectively.

The lock control apparatus 30 stores the identity information of the legal user, and the lock control apparatus 30 is used for authenticating the identity information sent by the authentication terminal 10, and responding the authentication passing message to the authentication terminal 10 after passing the authentication; and is also used for interworking with the terminal to be authenticated 20 after receiving the above random authorization code, and if judging that the random authorization codes of the authentication terminal 10 and terminal to be authenticated 20 are consistent, then unlocking, wherein the interworking of the lock control apparatus 30 and the terminal to be authenticated 20 is limited by the distance, for example one distance range during the interworking of the terminal to be authenticated 20 and the lock control apparatus 30 can be configured according to the need of practical application, for example the lock control apparatus 30 and the terminal to be authenticated 20 only are able to interwork in the range of the distance within 2 meters, and since this distance is nearer, this interworking is called as near distance interworking.

The terminal to be authenticated 20 is used for storing the received random authorization code, and is also used for carrying out the near distance interworking of the random authorization code with the lock control apparatus 30.

Wherein the identity information sent by the authentication terminal 10 to the lock control apparatus 30 can be identifier (for example the number) information of this authentication terminal 10, and also can be the user name and password information input by the user using this authentication terminal 10.

The lock control apparatus 30 also stores standard voice information of all the legal users; accordingly, this lock control apparatus 30 can be further used for sending the standard voice information corresponding to this legal user to the authentication terminal 10 after confirming that the identity information is legal according to the identity information sent by the authentication terminal 10, and comparing received voice information sent by the authentication terminal 10 with the above standard voice information, and if judging that the voice information and standard voice information come from the same one person, then responding the authentication passing message to the authentication terminal 10. And the authentication terminal 10 is used for prompting the user to repeat after receiving the standard voice information sent by the lock control apparatus 30; and is also used for sending the voice information repeated by the user to the lock control apparatus 30.

Besides, the lock control apparatus 30 is further used for deleting the random authorization code on the lock control apparatus 30 or setting the random authorization code on the lock control apparatus 30 to be invalid after unlocking so as to prevent the user who holds this random authorization code entering or exiting arbitrarily and frequently, which further ensures the security of the access control system.

Wherein the lock control apparatus 30 comprises: a storage module 31, a wireless transceiver module 32, an authentication module 33, an interworking module 34 and an electromagnetic lock 35, wherein:

the storage module 31 is used for storing identity information of all the legal users;

the wireless transceiver module 32 is used for receiving the identity information sent by the authentication terminal 10; and is also used for sending the authentication passing message sent by the authentication module 33 to the authentication terminal 10; and is also used for receiving the random authorization code, and sending the random authorization code to the interworking module 34;

the authentication module 33 is used for authenticating the received identity information according to the identity information of the legal user stored in the storage module 31, and sending the authentication passing message to the wireless transceiver module 32 after passing the authentication;

the interworking module 34 is used for carrying out the near distance interworking with the terminal to be authenticated 20 after receiving the random authorization code, and if judging that the random authorization codes of the terminal to be authenticated 20 and the authentication terminal 10 are consistent, indicating the electromagnetic lock 35 to unlock.

Figure 2:
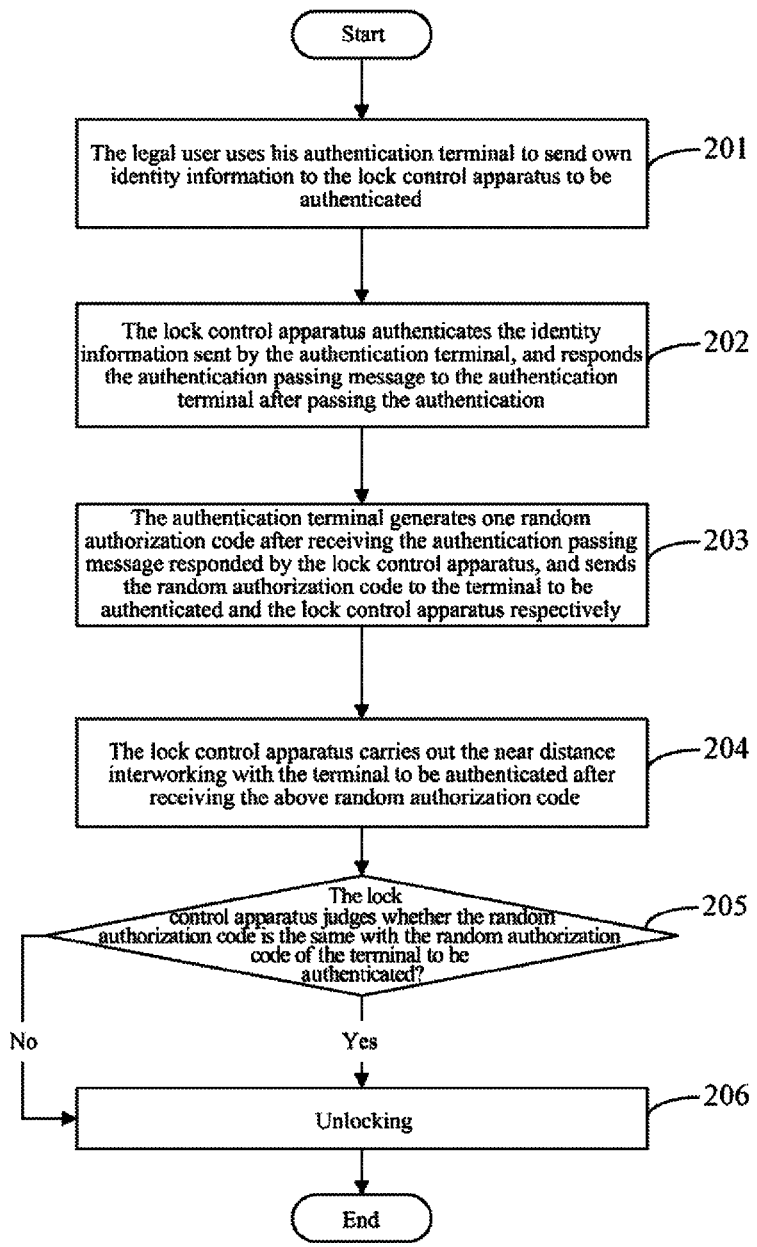
FIG. 2 is a flow chart of the method for remote control unlocking of the legal user according to the example of the present invention.

As shown in FIG. 2, the method for remote control unlocking of the legal user is applied in the case that this legal user wants to unlock for his visitor but is unable to manually unlock personally, and comprises following steps:

step 201, the legal user uses his/her authentication terminal to send own identity information to the lock control apparatus to be authenticated.

Wherein the identity information can be identifier (for example the number) information of this authentication terminal, and also can be the user name and password information input by the user using this authentication terminal.

Step 202, the lock control apparatus authenticates the identity information sent by the authentication terminal, and responds the authentication passing message to the authentication terminal after passing the authentication.

The lock control apparatus also can store the standard voice information of all the legal users; accordingly, this lock control apparatus sends the standard voice information corresponding to this legal user to this authentication terminal after confirming that the identity information is legal according to the identity information sent by the authentication terminal; the authentication terminal prompts the user to repeat after receiving the standard voice information sent by the lock control apparatus, and sends the voice information repeated by the user to the lock control apparatus; and the lock control apparatus compares the received voice information sent by authentication terminal with the above standard voice information, and if judging that both are from the same person, further responds the authentication passing message to the authentication terminal.

Step 203, the authentication terminal generates one random authorization code after receiving the authentication passing message responded by the lock control apparatus, and sends the random authorization code to the terminal to be authenticated and the lock control apparatus respectively.

Step 204, the lock control apparatus carries out the near distance interworking with the terminal to be authenticated after receiving the above random authorization code.

Steps 205~206, the lock control apparatus judges whether the random authorization code is the same with the random authorization code of the terminal to be authenticated, and if yes, execute the step 206, unlocks; or else, this flow ends.

After unlocking, the lock control apparatus can delete the random authorization code on the lock control apparatus or set the random authorization code on the lock control apparatus to be invalid so as to prevent the user holding this random authorization code entering and exiting arbitrarily and frequently, which further ensures the security of the access control system.

Besides, another access control system also comprises the lock control apparatus, the authentication terminal and the terminal to be authenticated, and the authentication terminal and lock control apparatus store the same authorization code;

the authentication terminal is used for sending the authorization code to the terminal to be authenticated;

the lock control apparatus is used for carrying out the near distance interworking with the terminal to be authenticated, and if judging that both of the authorization codes are consistent, then unlocking;

the terminal to be authenticated is used for storing the received authorization code, and is also used for carrying out the near distance interworking of the authorization code with the lock control apparatus.

And the method for remote control unlocking of the legal user corresponding to another access control system comprises:

the legal user stores the same authorization code in the authentication terminal and the lock control apparatus;

the authentication terminal sends this authorization code to the terminal to be authenticated;

the lock control apparatus and the terminal to be authenticated carry out the near distance interworking, and if judging that both of the authorization code are consistent, then the lock control apparatus unlocks.

It can be seen from the above description that the authentication terminal can send its authorization code to the terminal to be authenticated which can be trusted by the authentication terminal, and the terminal to be authenticated can enter the door depending on this authorization code.

Certainly, the present invention can further have other various examples, and various corresponding modifications and transformations can be made according to the present invention by those skilled in the art without departing from the spirit or essence of the present invention. Such corresponding modifications and transformations shall all fall into the protection scope of the appended claims of the present invention.

What is claimed is:

1. An access control system, comprising: a lock control apparatus, an authentication terminal and a terminal to be authenticated, wherein said authentication terminal is configured to:
send its own identity information to the lock control apparatus for the lock control apparatus authenticating the identity of the authentication terminal,
receive an authentication passing message responded by said lock control apparatus, wherein the authentication passing message indicates that the identity of the authentication terminal is legal, generate a random authorization code after receiving the authentication passing message responded by said lock control apparatus, and send the random authorization code to said terminal to be authenticated and said lock control apparatus respectively;

said lock control apparatus is configured to:

store identity information of a legal user;

authenticate the identity information sent by said authentication terminal according to the identity information of the legal user to determine whether the identity of the authentication terminal is legal, and respond said authentication passing message to said authentication terminal if the identity of the authentication terminal is legal; and interwork with said terminal to be authenticated after receiving said random authorization code, and judge that whether the random authorization codes of the authentication terminal and the authentication terminal to be authenticated are consistent, if judging that the random authorization codes of the authentication terminal and the authentication terminal to be authenticated are consistent, then unlock;

said terminal to be authenticated is configured to store the received random authorization code, and interwork said random authorization code with said lock control apparatus.

2. The access control system as claimed in claim 1, wherein the identity information sent by said authentication terminal to said lock control apparatus is identifier information of said authentication terminal, or is user name and password information input by a user using said authentication terminal.

3. The access control system as claimed in claim 1, wherein said lock control apparatus is further configured to store standard voice information of the legal user;

said lock control apparatus is further configured to send the standard voice information corresponding to this legal user to said authentication terminal after confirming that this identity information sent by said authentication terminal is legal, and compare received voice information sent by said authentication terminal with above standard voice information, and if judging that the received voice information sent by said authentication terminal and the above standard voice information are from a same one person, further respond said authentication passing message to said authentication terminal;

said authentication terminal is further configured to prompt a user using said authentication terminal to repeat after receiving the standard voice information sent by said lock control apparatus; and is further configured to send voice information repeated by the user to said lock control apparatus.

4. The access control system as claimed in claim 1, wherein said lock control apparatus is further configured to delete the random authorization code stored by self or set the random authorization code stored by self to be invalid after unlocking.

5. The access control system as claimed in claim 1, wherein said lock control apparatus comprise: a wireless transceiver module, a storage module, an authentication module, an interworking module and an electromagnetic lock;

said storage module is configured to store the identity information of all the legal users;

said wireless transceiver module is configured to receive the identity information sent by said authentication terminal; and is further-configured to send said authentication passing message sent by said authentication module to said authentication terminal; and is further configured to receive said random authorization code, and send the random authorization code to said interworking module;

said authentication module is configured to authenticate said received identity information according to the identity information of the legal user stored in said storage module to determine whether the identity of the authentication terminal is legal, and send said authentication passing message to said wireless transceiver module if the identity of the authentication terminal is legal;

said interworking module is configured to interwork with said terminal to be authenticated after receiving said random authorization code, and if judging that the random authorization codes of the authentication terminal and the terminal to be authenticated are consistent, then instruct said electromagnetic lock to unlock.

6. The access control system as claimed in claim 2, wherein said lock control apparatus is further configured to delete the random authorization code stored by self or set the random authorization code stored by self to be invalid after unlocking.

7. The access control system as claimed in claim 3, wherein said lock control apparatus is further configured to delete the random authorization code stored by self or set the random authorization code stored by self to be invalid after unlocking.

8. A method for remote control unlocking, this method comprising:

an authentication terminal sending own identity information to a lock control apparatus for the lock control apparatus authenticating the identity of the authentication terminal;

said lock control apparatus authenticating said identity information sent by said authentication terminal according to identity information of a legal user stored in said lock control apparatus to determine whether the identity of the authentication terminal is legal, and responding an authentication passing message indicating that the identity of the authentication terminal is legal to said authentication terminal if determining the identity of the authentication terminal is legal;

said authentication terminal generating a random authorization code after receiving the authentication passing message responded by said lock control apparatus, and sending the random authorization code to a terminal to be authenticated and the lock control apparatus respectively;

said lock control apparatus interworking with said terminal to be authenticated after receiving the above random authorization code, and judging that whether the random authorization codes of the authentication terminal and the terminal to be authenticated are consistent, if judging that the random authorization codes of the authentication terminal and the terminal to be authenticated are consistent, then unlocking.

9. The method as claimed in claim 8, wherein said identity information is identifier information of said authentication terminal, or is user name and password information input by a user using said authentication terminal.

10. The method as claimed in claim 8, wherein the lock control apparatus further stores standard voice information of the legal user;

said lock control apparatus authenticating said identity information sent by said authentication terminal according to identity information of the legal user stored in said lock control apparatus to determine whether the identity of the authentication terminal is legal, and responding the authentication passing message to said authentication terminal if the identity of the authentication terminal is legal particularly comprises:

said lock control apparatus sending the standard voice information corresponding to this legal user to said authentication terminal after confirming that this identity information sent by said authentication terminal is legal;

said authentication terminal prompting a user using said authentication terminal to repeat after receiving the standard voice information sent by said lock control apparatus, and sending voice information repeated by the user to said lock control apparatus;

said lock control apparatus comparing received voice information sent by the authentication terminal with the above standard voice information, and if judging that the received voice information and the standard voice information are from a same person, responding said authentication passing message to said authentication terminal.

11. The method as claimed in claim 8, further comprising: said lock control apparatus deleting the random authorization code stored by self or setting the random authorization code stored by self to be invalid after unlocking.

12. The method as claimed in claim 9, further comprising: said lock control apparatus deleting the random authorization code stored by self or setting the random authorization code stored by self to be invalid after unlocking.

13. The method as claimed in claim 10, further comprising: said lock control apparatus deleting the random authorization code stored by self or setting the random authorization code stored by self to be invalid after unlocking.

* * * * *